Sept. 7, 1937.　　　　K. W. WARREN　　　　2,092,233

SHOCK STRUT

Filed Oct. 19, 1935

INVENTOR.
KENNETH W. WARREN
BY　A. E. Wilson
ATTORNEY.

Patented Sept. 7, 1937

2,092,233

UNITED STATES PATENT OFFICE 2,092,233

SHOCK STRUT

Kenneth W. Warren, South Bend, Ind., assignor to Bendix Products Corporation, South Bend, Ind., a corporation of Indiana Application October 19, 1935, Serial No. 45,757

17 Claims. (Cl. 267—64)

This invention relates to fluid shock absorbers, and more particularly to means for controlling the flow of fluid from one chamber of the absorber to another.

It is desirable in the commercial use of fluid shock absorbing struts for aircraft that the flow of fluid from one chamber to another during the telescoping action of the main members of the strut be delayed until the pneumatic tires commonly employed on aircraft have been approximately deflected. This desideratum, however, is difficult to achieve where means are provided to vary the resistance of the strut by controlling the rate of fluid flow from one chamber to another continuously over the entire working length of the shock absorber.

It is also desirable that the resistance resulting from the telescoping action of the strut, be greater at the beginning of its working stroke (after the tire has been deflected) than during the latter stages of the load absorbing operation of the strut, when the resistance is progressively decreased.

It is therefore an object of this invention to provide a fluid shock absorber having means for preventing the flow of fluid from one chamber to another until a predetermined fluid pressure sufficient to permit the tire to be fully deflected has been developed.

Another object of the invention is to provide a shock absorber of the differential fluid pressure actuated type having means to prevent deflection of the strut until it is subjected to a predetermined load; means to permit rapid deflection of the strut when subjected to a predetermined load; and means to progressively decrease the deflection of the strut when subjected to increased or continued load.

A further object of the invention is to provide adjustable means for controlling the initial effective pressure requisite to actuate the shock absorber.

Another object of the invention is to provide a multi-chambered fluid shock absorbing strut having an orifice to permit the flow of fluid from one chamber to another and novel means adapted to resiliently close the orifice when not subjected to load and to open the orifice upon the application of a predetermined differential of fluid pressure on opposite sides of the closing means.

A still further object of the invention is to provide a spring-loaded sleeve on the end of the metering pin of a shock absorbing strut operable to close the fluid orifice of the strut until a predetermined fluid pressure is developed within the strut sufficient to compress the spring.

Other objects and advantages of the invention will be apparent from the following detailed description considered in connection with the accompanying drawing submitted for purposes of illustration only and not intended to define the scope of the invention, reference being had for that purpose to the subjoined claims.

In the drawing, wherein similar reference characters refer to similar parts throughout the several views.

Figure 1:
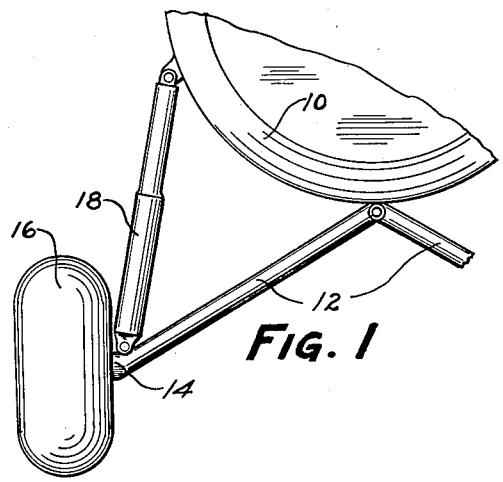
Figure 1 is a view showing a portion of an airplane equipped with a shock absorbing strut embodying the present invention.

Referring more particularly to Figure 1 there is shown, for purposes of illustrating this invention, a portion of an airplane including a fuselage 10 equipped with a landing gear comprising diagonally disposed brace members 12 pivotally mounted with respect to the fuselage 10. The brace members 12 are provided at their lower ends with an axle 14 adapted to receive a pneumatic tire 16.

Figure 2:
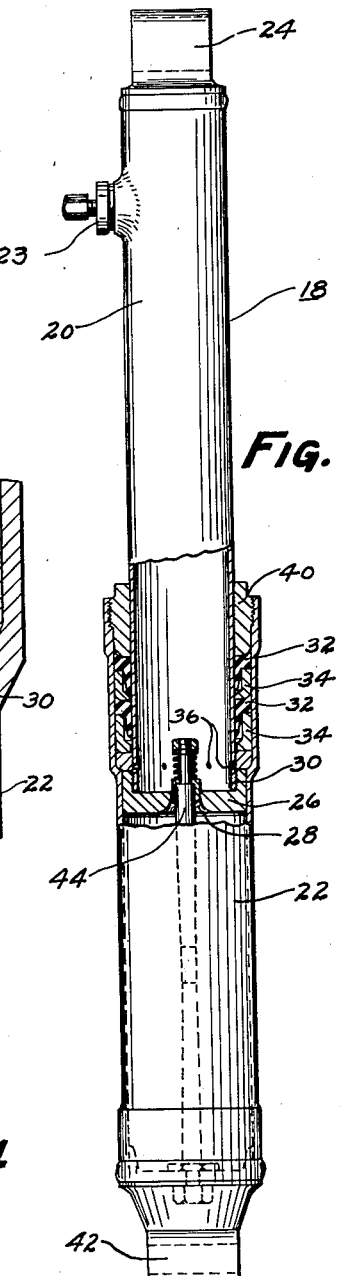
Figure 2 is a view in elevation, partly in section, of a shock strut equipped with the orifice control means of the present invention.

A fluid shock absorbing strut 18 of the type more particularly illustrated in Figure 2 interconnects the axle 14 with a portion of the fuselage 10 and cooperates with the tire 16 to absorb the shock to which the aircraft is subjected during landing operations.

Referring now to Figure 2, there is shown a shock strut 18 including a pair of telescoping cylinders 20 and 22. The lower cylinder 22 is designed to receive a liquid of suitable viscosity and the upper cylinder 20 is designed to be subjected to air pressure, a plug 23 being provided in the cylinder 20 for the introduction of air. The cylinder 20 is provided at its upper end with a fitting 24 designed to permit pivotal connection to the fuselage 10. The lower end of the cylinder 20 is closed by a cap 26, having a central orifice 28 positioned therein. The cap 26 may be fixed to the cylinder by screw threads 30 or in any other desired manner.

The upper cylinder 20 is slidably mounted within the lower cylinder 22. The upper end of the cylinder 22 is enlarged to provide a space between the cylinders to accommodate packing means including rubber cups 32 and metal discs 34 positioned between the rubber cups. The lower end of the cylinder 20 is provided with a plurality of apertures 36 to permit liquid to flow into the space between the cylinders to urge the tongues 38 of the rubber cups 32 into engagement with the outer surface of the cylinder 20 to prevent liquid from escaping. A sleeve 40 threaded into the upper end of the lower cylinder 22 cooperates with the cap 26 to guide the cylinders. The packing means 32 and 34 are interposed between the cap 26 and the sleeve 40 to prevent separation of the cylinders.

The lower cylinder 22 is provided with a fitting 42 adapted to permit pivotal movement with reference to the axle 14.

A contoured metering pin 44 fixed in the bottom of the cylinder 22 projects upwardly and extends through the orifice 28 in the cap 26 carried by the upper cylinder 20. It will be observed that as the cylinder 20 moves downwardly in the cylinder 22 the metering pin 44 moves upwardly through the orifice 28, thereby varying the effective area of the liquid orifice and progressively controlling the flow of liquid, and the resulting resistance set up in the shock absorber.

Figure 3:
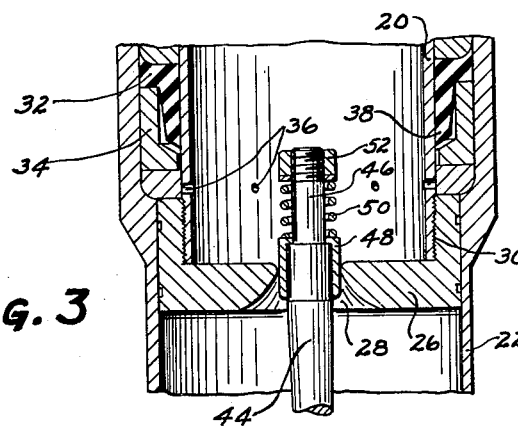
Figure 3 is an enlarged view of the metering pin and associated parts of the shock strut illustrated in Figure 2, in the fully extended position.
Figure 4:
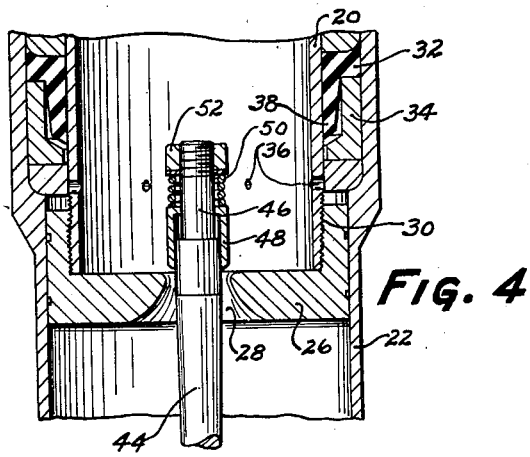
Figure 4 is a view similar to Figure 3 showing the strut partially compressed.

The upper end of the metering pin 44 is provided with a threaded section of reduced diameter 46 adapted to receive a sleeve 48 designed to engage the outer surface of the pin 44 and the inner surface of the cap 26 to close the orifice 28 when the cylinders 20 and 22 are in the fully extended position. The sleeve 48 is a sliding fit with both the end of the pin 44 and the cap 26 so as to completely close the orifice 28 when moved into operative position as illustrated in Figure 3. The sleeve 48 is yieldingly urged downwardly over the end of the pin 44 by a spring 50 positioned between the sleeve and an adjustable nut 52.

The operation of this device is as follows. When the aircraft is in flight the shock strut 18 is fully extended as shown in Figures 2 and 3, the sleeve 48 projecting over the end of the metering pin 44 and closing the orifice 28 in the cap 26. The initial shock of landing operates to deflect the tire 16. As the tire becomes deflected an upwardly directed force is exerted on the lower cylinder 22 due to the contact with the ground and a downwardly directed force is exerted on the upper cylinder 20 due to the weight of the aircraft. A telescoping action of the cylinders therefore takes place to exert pressure on the liquid in the lower cylinder 22. The pressure acts on the projected area of the sleeve 48 to force it upwardly, compressing the spring 50 and moving the sleeve 48 out of the orifice 28 to permit liquid to flow from the lower cylinder 22 to the upper cylinder 20.

As soon as the sleeve 48 has moved out of the orifice 28, a comparatively large area is exposed to permit the liquid to flow upwardly so that rapid telescoping action of the cylinders is effected. As the telescoping action progresses, a larger diameter of the metering pin 44 may pass through the orifice 28 to vary the effective area of the orifice thereby controlling the flow of liquid and progressively varying the rate of the telescoping action and the resulting resistance of the absorber. As the liquid is transferred from the lower cylinder to the upper cylinder the air compressed in the upper cylinder is compressed to a higher degree to resist telescoping action of the strut members.

When the load is removed from the strut the air compressed in the upper cylinder 20 exerts a force to move the cylinders to the fully extended position, whereupon the sleeve 48 carried by the metering pin 44 again closes the orifice 28 in the cap 26. A check valve may be positioned in the cap 26 to insure rapid return of the liquid to the liquid chamber.

While the invention has been described as embodied in a strut having a liquid cylinder and a fluid cylinder, it is obvious, of course, that if desired the fluid cylinder may be replaced by any desired resilient member such, for example, as a spring positioned either in the liquid cylinder or above the liquid cylinder.

Although the invention has been described with particular reference to a preferred embodiment, it is to be understood that the scope of the invention is not to be limited to the specific features illustrated and described, nor otherwise than by the terms of the following claims.

I claim:

1. A shock absorber comprising a pair of telescoping cylinders, a closure having an orifice therein carried by one of the cylinders, a metering pin carried by the other cylinder projecting through the orifice, the cross-sectional area of the end of the pin projecting through the orifice being less than the area of the orifice to provide an open portion, and means carried by the metering pin to close the open portion of the orifice when the cylinders are in the fully extended position.

2. A shock absorber comprising a pair of telescoping cylinders, a quantity of liquid in one of the cylinders, compressed air in the other cylinder, a closure having an orifice therein carried by one of the cylinders, a metering pin carried by the other cylinder projecting through the orifice, the cross-sectional area of the end of the pin projecting through the orifice being less than the area of the orifice to provide an open portion, means carried by the metering pin to close the open portion of the orifice when the cylinders are in the fully extended position, and yielding means to permit the closing means to open the orifice upon the existence of a predetermined liquid pressure in one of the cylinders.

3. In an aircraft shock strut, a liquid cylinder, a fluid cylinder, means including an orifice to permit transfer of liquid from the liquid cylinder to the fluid cylinder, a metering pin carried by the liquid cylinder and projecting through the orifice to control the resistance developed by the liquid flow from the liquid cylinder to the fluid cylinder, the cross-sectional area of the end of the pin projecting through the orifice being less than the area of the orifice to provide an open portion, and means carried by the metering pin to substantially close the open portion of the orifice when the cylinders are in the extended position.

4. In an aircraft shock strut, a liquid cylinder, a fluid cylinder, means including an orifice to permit transfer of liquid from the liquid cylinder to the fluid cylinder, a metering pin carried by the liquid cylinder and projecting through the orifice to control the resistance developed by the flow of liquid from the liquid cylinder, the cross-sectional area of the end of the pin projecting through the orifice being less than the area of the orifice to provide an open portion, means including a sleeve carried by the metering pin to close the open portion of the orifice when the cylinders are in the extended position, and yielding means controlling said sleeve.

5. An airplane having a landing gear including a pneumatic tire and an axle, shock absorber means including a pair of telescoping cylinders, a quantity of liquid in one of the cylinders, a fluid in the other of the cylinders, means including a closure having an orifice therein carried by the fluid cylinder to permit the flow of liquid from the liquid cylinder to the fluid cylinder, means including a metering pin projecting through the orifice to control the resistance developed by the flow of liquid, the cross-sectional area of the end of the pin projecting through the orifice being less than the area of the orifice to provide an open portion, and means carried by the metering pin to close the open portion of the orifice when the cylinders are in the extended position.

6. An airplane having a landing gear including a pneumatic tire and an axle, shock absorber means including a pair of telescoping cylinders, a quantity of liquid in one of the cylinders, a fluid in the other of the cylinders, means including a closure having an orifice therein carried by the fluid cylinder to permit the flow of liquid from the liquid cylinder to the fluid cylinder, means including a contoured metering pin projecting through the orifice to control the resistance developed by liquid flow, the cross-sectional area of the end of the pin projecting through the orifice being less than the area of the orifice to provide an open portion, means including a sleeve carried by the end of the metering pin to close the open portion of the orifice when the cylinders are in the extended position, yielding means controlling the sleeve, and adjustable means to vary the resiliency of the yielding means to permit the sleeve to open the orifice when the pneumatic tire has been deflected a predetermined amount.

7. In a shock strut a plurality of fluid chambers, means including an orifice to permit the flow of fluid from one chamber to another, means including a metering pin projecting through the orifice to control the resistance developed by the shock strut, the cross-sectional area of the end of the pin projecting through the orifice being less than the area of the orifice to provide an open portion, and means including a sleeve slidably mounted on the end of the metering pin adapted to substantially close the open portion of the orifice when the fluid chambers are in the extended position.

8. In a shock strut a plurality of fluid chambers, means including an orifice to permit the flow of fluid from one chamber to another, means including a contoured metering pin projecting through the orifice to control the resistance developed by fluid flow from one chamber to another, the cross-sectional area of the end of the pin projecting through the orifice being less than the area of the orifice to provide an open portion, and means including a sleeve slidably mounted on the end of the metering pin adapted to close the open portion of the orifice when the fluid chambers are in the extended position, and adjustable yielding means controlling the sleeve to permit opening of the orifice at a predetermined pressure.

9. A shock absorber metering pin having means carried by one end of the pin to attach the metering pin to the shock strut, a contoured section, a threaded section of reduced diameter at one end of the pin, a sleeve slidably mounted on the section of reduced diameter and adapted to engage the end of the pin, adjustable means including a nut carried by the threaded section, and yielding means interposed between the sleeve and the adjustable means.

10. A hydraulic and pneumatic shock absorber comprising a pair of telescoping members, a quantity of liquid in one of the members, a quantity of fluid in the other of the members, orificed means between the members to permit the flow of liquid from one of the members to the other, a metering pin projecting through the orificed means, the cross-sectional area of the end of the pin projecting through the orifice being less than the area of the orifice to provide an open portion, and means carried by the metering pin to close the open portion of the orificed means when the shock absorber is not subjected to load.

11. A shock absorber comprising a pair of telescoping cylinders, an orificed closure between the cylinders, fluid and liquid in the cylinders, a metering pin projecting through the orificed closure, the cross-sectional area of the end of the pin projecting through the orifice being less than the area of the orifice to provide an open portion, and means carried by the metering pin to close the open portion of the orificed closure when the cylinders are in the fully extended position.

12. In a shock absorber a pair of telescoping cylinders, liquid and fluid in the cylinders, means including an orifice separating the cylinders, a metering pin having an extension projecting through the orifice, the cross-sectional area of the end of the pin projecting through the orifice being less than the area of the orifice to provide an open portion, and means carried by the extension to close the open portion of the orifice when the cylinders are in the extended position.

13. In a shock absorber a pair of telescoping cylinders, liquid and fluid in the cylinders, means including an orifice separating the cylinders, a metering pin having a section of reduced diameter projecting through the orifice, the cross-sectional area of the end of the pin projecting through the orifice being less than the area of the orifice to provide an open portion, and means carried by the section of reduced diameter to substantially close the open portion of the orifice when the cylinders are in the extended position.

14. A hydraulic and pneumatic shock absorber comprising a pair of telescoping cylinders, a quantity of liquid in one of the cylinders, a quantity of fluid in the other of the cylinders, orificed means between the cylinders to permit the flow of liquid from one of the cylinders to the other, a metering pin projecting through the orificed means, the cross-sectional area of the end of the pin projecting through the orifice being less than the area of the orifice to provide an open portion, and means carried by the metering pin to yieldingly close the open portion of the orificed means when the shock absorber is not subjected to load.

15. A shock absorber comprising a pair of telescoping cylinders, an orificed closure between the cylinders, fluid and liquid in the cylinders, a metering pin projecting through the orificed closure, the cross-sectional area of the end of the pin projecting through the orifice being less than the area of the orifice to provide an open portion, and means carried by the metering pin to yieldingly close the open portion of the orificed closure when the cylinders are in the fully extended position.

16. A metering pin for a shock strut having a contoured body section, means to attach one end of the metering pin to the shock strut, a threaded section of reduced diameter at the other end, a sleeve slidably mounted on the section of reduced diameter and yieldingly urged to engage the end of the pin adjacent the section of reduced diameter.

17. In a shock absorber a pair of telescoping cylinders, liquid and fluid in the cylinders, means including an orifice separating the cylinders, a metering pin having an extension projecting through the orifice, the cross-sectional area of the end of the pin projecting through the orifice being less than the area of the orifice to provide an open portion, means carried by the extension to close the open portion of the orifice when the cylinders are in the extended position and adjustable yielding means urging the closing means in a direction to close the orifice.

KENNETH W. WARREN.